Sept. 16, 1958

M. A. BERGSTEDT

ADHESIVE COATED METALLIC SHEET AND
ITS METHOD OF MANUFACTURING

Filed June 8, 1954

2,852,421

INVENTOR
MILTON A. BERGSTEDT
BY Norman St. Landau
ATTORNEY 2,852,421

ADHESIVE COATED METALLIC SHEET AND ITS METHOD OF MANUFACTURING

Milton Alfred Bergstedt, Linden, N. J., assignor, by mesne assignments, to Johnson & Johnson, New Brunswick, N. J., a corporation of New Jersey Application June 8, 1954, Serial No. 435,230

8 Claims. (Cl. 148—6.14)

This invention relates to adhesive products comprising metals commercially used as conductors in the form of film such as electrolytic copper that are coated with heat-setting adhesives, providing a means for bonding these metals permanently to a variety of surfaces. While not limited thereto, the invention is concerned particularly with metal foils and with adhesives composed of combinations of any one or more of the acetals and one or more aldehydes.

The products of the invention are of particular utility in connection with industrial metal bonding, with electrical and electronic apparatus, and especially with so-called printed circuits. In connection with these uses it is necessary that the metal be bonded to underlying surfaces in such a manner that maximum conductivity of the metal is well preserved and that the metal is insulated from the underlying surface. It is particularly important that the metal be securely attached to the underlying surface so that it does not come loose even during strenuous use, and so that no impurities of any kind can enter the space between metal and underlying surface. It is important that all this be accomplished with a minimum of time loss in the bonding operation and with as little complication as possible. It is also important that the product be provided at relatively low cost and require but little additional expense in the bonding step.

Accordingly, it is an object of this invention to provide an adhesive product comprising an adhesive coated web of metal of the copper group. It is a further object of the invention to provide such a product of particular utility for the electrical and electronic industries. A further object is the provision of this adhesive product having maximum conductivity. Yet further objects of the invention are provision of adhesive metal that does not come loose even when subjected to strenuous conditions of use, that may be provided at low cost and that involve but a minimum complexity, loss of time and, accordingly, minimum expense in the bonding operation. Still further objects of the invention will be obvious from the following description, particularly when it is considered in connection with the drawings, wherein similar numerals refer to similar parts throughout the several views shown, and which are shown merely by way of example, and not by way of limiting the invention. In these figures:

Figures 1, 2, 3:
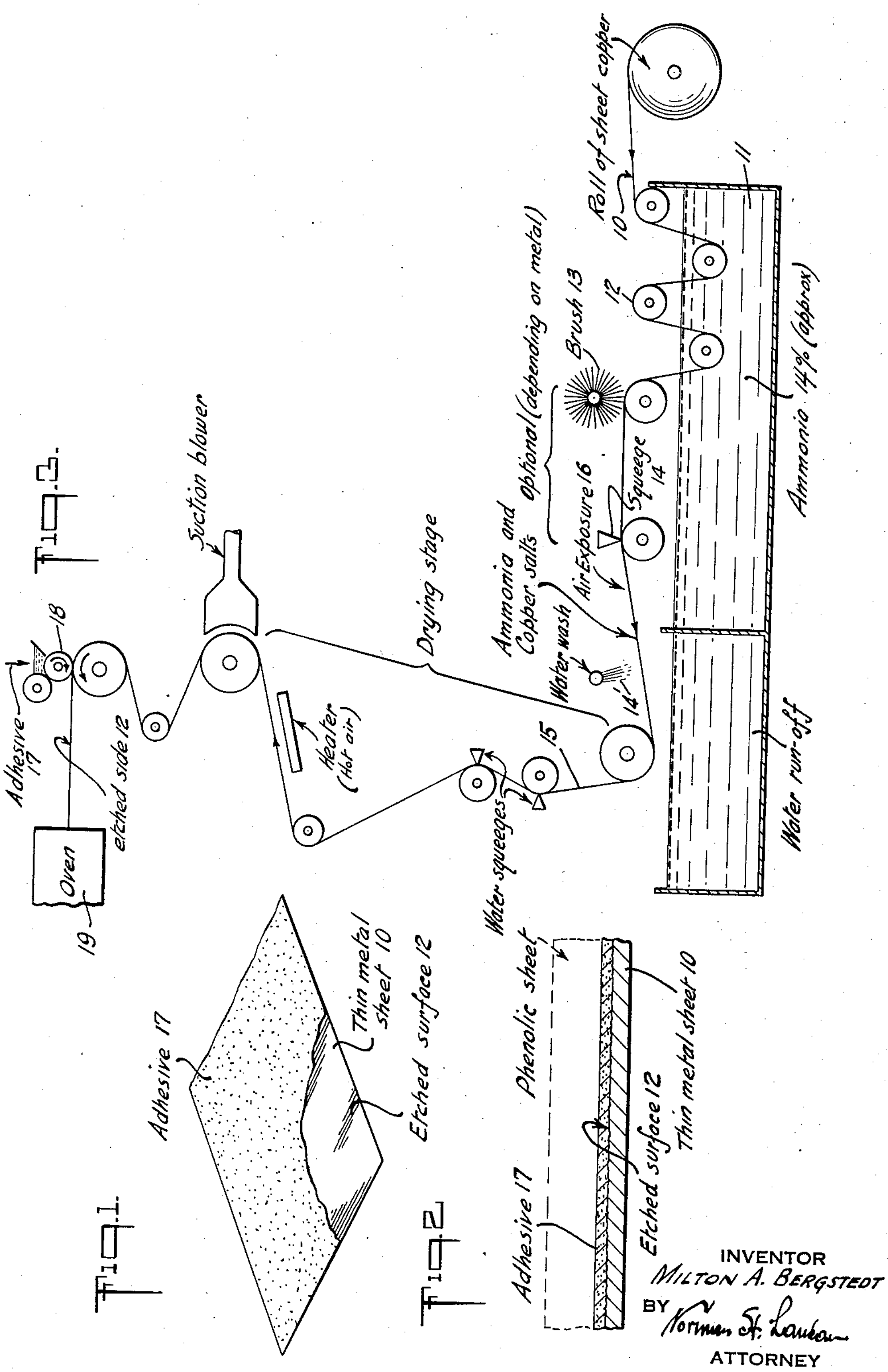
Fig. 1 is a perspective view of a piece of basic bonded adhesive metal foil.
Fig. 2 is a vertical section through lines 2—2 of Fig. 1.
Fig. 3 is a schematic view of a process and devices for preparing the basic bonded adhesive metal foil of Figs. 1 and 20.

In accordance with one embodiment of the invention shown in Fig. 1, a thin sheet 10 of metal of the copper group, e. g. copper foil of a thickness of from 0.5 to 10 mils is used. This foil may be electro precipitated or rolled, or obtained in any other manner, except that it is important that the material be as pure as possible prior to further treatment in accordance with the invention. At least one side of the metal is basic bonded by etching by treatment, for instance by submersion in a base in a bath 11, preferably ammonium hydroxide solution, although amine bases and hydrazine may also be used. If ammonium hydroxide treatment is used, concentrations of two to about forty per cent ammonia are preferred. The etched side 12 is cleaned, for instance with a rotary brush 13, as the metal leaves the treatment, which may be in a bath. Excess ammonia may be removed, for instance by using a rubber squeegee 14–A.

Following treatment, the surface is cleaned further, for example by submersion in running water or other water treatment 14, which may be repeated, and is again cleaned, preferably followed by removal of any excess water, as shown at 15. Heat treatment may serve to remove the last traces of aqueous liquid.

It is particularly helpful to expose the metal surface to air and oxidize it in presence of the base prior to removal of the base, as is shown at 16. Using, for example, a fourteen per cent ammonia solution, a minimum of fifteen seconds of air exposure for formation of oxides is desirable, although air exposure for periods exceeding sixty seconds at that concentration further improves the resulting bond. Minimum times of air exposure may be adjusted so as to provide more exposure when the exposure temperature exceeds normal room temperature.

After cleaning, oxidizing, washing and drying, the foil is coated on a conventional coater 18 to provide a basic bond with adhesive film 17, preferably an adhesive film based on an aldehyde resin and an acetal. Among preferred aldehyde resins are the initially alcohol soluble heat-hardening aldehyde resins, particularly the initially alcohol soluble heat-hardening phenol, resorcinol, cresol and xylenol aldehyes, and preferably the formaldehydes, acetaldehydes and homologs. The preferred aldehyde resins are condensation products that are alkali-catalyzed and initially alcohol soluble and heat-hardening.

Among preferred acetals are the polyvinyl acetals, polyvinyl propionals, the polyvinyl butyrals, polyvinyl pentals and the polyvinyl hexals. The term "polyvinyl acetal" is used in this specification in its generic sense to include the group rather than polyvinyl acetal itself, except in the specific example and in the preceding sentence. Whenever mention is made herein of acetals or aldehyde resins as suitable, the isomers are similarly suitable.

The aldehyde resin may comprise from about ten percent to about ninety percent by weight of the composition, and the acetal from about ninety per cent to about ten percent of the composition. Mixed aldehyde resins and mixed polyvinyl acetals or combinations or mixtures of both may be used.

The adhesive coating film may have a thickness of from about one-quarter of one mil to about ten mils. A typical film applied to a thickness of about one and one-half mils comprises

| | Parts by weight |
|---|---|
| Polyvinyl butyral (7% hydroxyl, 2.6 times greater when calculated as vinyl alcohol, intrinsic viscosity 0.81–1.16 in cyclohexanone at 20° C., specific gravity 1.03) | 10–90 |
| Alcohol soluble curing phenol formaldehyde resin, alkali condensed (ratio of phenol to formaldehyde 1.1 to 1.5) | 90–10 |
| Victoria green crystals | 0.02 |

and may be applied from solvent solution comprising alcohols such as mixtures of ethyl alcohol, isopropyl alcohol, together with solvents such as toluene, methyl ethyl ketone, normal and butyl alcohol. The solvent is evaporated after application, e. g. in a drying oven 19. A typical solvent combination is

| | Parts by weight |
|---|---|
| Ethyl alcohol | 100 |
| Methyl ethyl ketone | 50 |

A further typical composition of the adhesive may comprise the following proportions:

| | Parts by weight |
|---|---|
| Polyvinyl butyral (5% hydroxyl, 23 centipoises viscosity, in 5% ethyl alcohol solution at 25° C.) | 25 |
| Phenol formaldehyde (ratio of phenol to formaldehyde 1.1 to 1.5, alkali condensed) | 50 |
| Polyvinyl acetal (melting point 178° C., specific gravity 1.16, produced from polyvinyl acetate with softening point of 1530 C., replacing 70% of the acetyl radicals with acid aldehyde) | 25 |

The product of the invention increases the bond strength of the adhesive metal by several times over that of untreated adhesive coated metal. It has proven of particular utility in the electrical and electronic industries, and particularly in connection with printed circuits.

The invention is not limited to the above examples but covers the above indicated concepts broadly.

The claims are:

1. An adhesive coated metallic sheet suitable for lamination to another element for use in the formation of an electrical circuit comprising a thin copper metal sheet, a coating of an oxide of copper on one surface of said sheet, and, overlying said coating, a coating of a thermosetting adhesive comprising a mixture of an acetal and an aldehyde resin.

2. A product according to claim 1 wherein the adhesive comprises a mixture of polyvinyl acetal and an aldehyde resin.

3. A product according to claim 1 wherein the adhesive comprises a mixture of polyvinyl butyral and an aldehyde resin.

4. A product according to claim 1 wherein the adhesive comprises a mixture of polyvinyl acetal and a phenol-aldehyde resin.

5. A product according to claim 1 wherein the adhesive comprises a mixture of polyvinyl butyral and a phenol-aldehyde resin.

6. The method of manufacturing an adhesive coated metallic sheet suitable for lamination to another element for use in the formation of an electrical circuit comprising cleaning at least one surface of a thin copper metal sheet with an alkali, forming an oxide on said surface by oxidation in the presence of said alkali, and coating said treated surface with a thermosetting adhesive composition comprising a mixture of an acetal and an aldehyde resin.

7. The process in accordance with claim 6 wherein the alkali comprises ammonium hydroxide.

8. The process in accordance with claim 6 wherein the adhesive comprises a mixture of polyvinyl acetal and a phenol-aldehyde resin.

References Cited in the file of this patent

UNITED STATES PATENTS

| | | |
|---|---|---|
| 1,946,647 | Taylor et al. | Feb. 13, 1934 |
| 2,460,898 | Meyer | Feb. 8, 1949 |
| 2,551,591 | Foord | May 8, 1951 |
| 2,694,650 | Herman et al. | Nov. 16, 1954 |

FOREIGN PATENTS

| | | |
|---|---|---|
| 531,273 | Great Britain | Jan. 1, 1941 |
| 550,285 | Germany | May 6, 1932 |

OTHER REFERENCES

Evans: "Corrosion of Metals," pages 130 and 131, published 1926.

UNITED STATES PATENT OFFICE
CERTIFICATE OF CORRECTION

Patent No. 2,852,421 September 16, 1958

Milton Alfred Bergstedt

It is hereby certified that error appears in the printed specification of the above numbered patent requiring correction and that the said Letters Patent should read as corrected below.

Column 1, line 64, for the numerical designations "1 and 20" read -- 1 and 2 --; column 3, line 10, for "1530 C." read -- 153° C. --.

Signed and sealed this 18th day of November 1958.

(SEAL)

Attest:

KARL H. AXLINE

Attesting Officer

ROBERT C. WATSON
Commissioner of Patents